United States Patent [19]
Imai et al.

[11] 4,316,004
[45] Feb. 16, 1982

[54] PROCESS FOR PRODUCING OXYBENZOYL COPOLYESTERS

[75] Inventors: Shozaburo Imai, Akashi; Hiroaki Sugimoto, Yao, both of Japan

[73] Assignee: Sumitomo Chemical Company, Limited, Osaka, Japan

[21] Appl. No.: 143,531

[22] Filed: Apr. 25, 1980

[30] Foreign Application Priority Data

May 11, 1979 [JP] Japan .................................. 54/58491

[51] Int. Cl.$^3$ ............................................ C08G 63/02
[52] U.S. Cl. .................................... 528/126; 528/128; 528/173; 528/179; 528/193
[58] Field of Search ............... 528/126, 128, 173, 179, 528/193

[56] References Cited

U.S. PATENT DOCUMENTS

| | | | |
|---|---|---|---|
| 2,600,376 | 6/1952 | Caldwell | 260/47 |
| 2,728,747 | 12/1955 | Aelony et al. | 260/78.3 |
| 3,637,595 | 1/1972 | Cottis | 528/193 |
| 3,759,870 | 9/1973 | Economy et al. | 260/47 |
| 3,767,621 | 10/1973 | Suzuki et al. | 260/47 |
| 3,857,814 | 12/1974 | Economy et al. | 528/486 |
| 3,884,876 | 5/1975 | Cottis et al. | 528/193 |
| 3,980,749 | 9/1976 | Cottis et al. | 264/331 |
| 4,067,852 | 1/1978 | Calundann | 528/190 |
| 4,146,702 | 3/1979 | Morris et al. | 528/191 |
| 4,219,629 | 8/1980 | Storm | 528/193 |

FOREIGN PATENT DOCUMENTS

| | | |
|---|---|---|
| 832 | 2/1979 | European Pat. Off. |
| 51-54690 | 5/1976 | Japan |
| 2006239 | 5/1979 | United Kingdom |

OTHER PUBLICATIONS

Gilkey et al., *J. Applied Polymer Sci.*, 2, No. 5, 1959, pp. 198–202.
Encyclopedia of Polymer Science and Technology, "Plastics, Resins, Rubbers, Fibers", vol. 1, 1969, Interscience Publishers, NY, p. 95.

*Primary Examiner*—Maurice J. Welsh
*Attorney, Agent, or Firm*—Stevens, Davis, Miller & Mosher

[57] ABSTRACT

A process for producing oxybenzoyl copolyesters comprising 3 to 300 of repeating unit of the formula, (I)

(continued)

wherein m and n are each 0 or 1, and W is —O—, —SO$_2$—, —S— or —CO—, which comprises reacting a compound of the formula, (II)

wherein R$^1$ is a hydrogen atom, a benzyl, lower alkyl or phenyl group, and Y is a hydrogen atom or a lower alkanoyl group, with a compound of the formula, (III)

wherein X is a halogen atom, in the presence of an aliphatic, alicyclic or aromatic hydrocarbon solvent having a boiling point of 100° to 260° C. under atmospheric pressure to produce bis(carboxyphenyl)phthalate, adding a compound of the formula, (V)

wherein W is —O—, —SO$_2$—, —S— or —CO—, Z is a hydrogen atom or an alkanoyl group, and m and n are each 0 or 1, and optionally a compound of the formula, (IV)

wherein R$^2$ and R$^3$ are each a hydrogen atom, a benzyl, lower alkyl or phenyl group, and carrying out polycondensation with the removal of the solvent and by-products so that the polycondensation system is made substantially free from the solvent at least at the end of the polycondensation to carry out substantial bulk polycondensation.

5 Claims, No Drawings

PROCESS FOR PRODUCING OXYBENZOYL COPOLYESTERS

The present invention relates to a process for producing oxybenzoyl copolyesters. More particularly, it relates to a process for producing oxybenzoyl copolyesters having partly or wholly a repeating structure of regularly arranged monomer units.

Production of oxybenzoyl copolyesters by polycondensation is disclosed in Japanese Pat. No. 47870/1972 and Japanese patent application Kokai (Laid-open) No. 43223/1975, and production of branched oxybenzoyl copolyesters is disclosed in Japanese patent application Kokai (Laid-open) No. 11697/1972. Any of the oxybenzoyl copolyesters produced by these methods has a random arrangement of oxybenzoyl units, dicarbonyl units and dioxyarylene units. Since these monomer units are arranged randomly, the copolyester molecules have unfusible regions composed of sequences of oxybenzoyl units alone and composed of coupled units of the dicarbonyl and dioxyarylene. These regions cause many problems such as a rise in melting point, immediate decomposition on fusion and an increase in orientation, and further, molded products have drawbacks for example anisotropy of strength and shrinkage and apparent fibrillation. In order to overcome these drawbacks, the introduction of a branching agent was proposed as described in Japanese patent application Kokai (Laid-open) No. 11697/1972. The agent fails, however, to prevent the above drawbacks effectively when used in small amount, while it makes fusibility poor and causes troubles on molding when used in large amount. Since, further, these methods involve solution polycondensation, large amounts of extremely high-boiling solvent are required, and in addition, after polycondensation, the solvent must be separated and recovered, and the resulting polycondensates must be washed. Consequently, these methods are economically disadvantageous.

For the reasons described above, the inventors extensively studied a method for producing oxybenzoyl copolyesters in an advantageous manner without using branching agents and high-boiling solvents. As a result, it was found that oxybenzoyl copolyesters having no drawbacks due to orientation and producing tough molded products can be obtained by introducing bis(-carboxyphenyl)phthalate resulting from the reaction between dicarboxylic acid chloride and hydroxybenzoic acid into the copolyester molecules thereby decreasing the proportion of the unfusible units. The objective copolyesters of excellent physical properties can be obtained economically advantageously by allowing a relatively small amount of specified solvent having a lower boiling point than that of the solvent used in the foregoing solution polycondensation to exist in the system only at the earlier stage.

According to the present invention, there is provided a process for producing oxybenzoyl copolyesters comprising 3 to 300 repeating units (regularly arranged monomer units) of the formula,

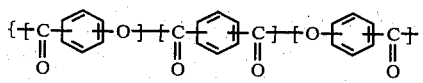
(I)

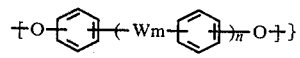

wherein m and n are each 0 or 1, and W is —O—, —SO$_2$—, —S— or —CO—, which comprises reacting a compound of the formula,

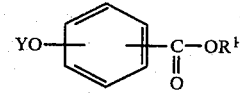
(II)

wherein R$^1$ is a hydrogen atom, a benzyl, lower alkyl or phenyl group, and Y is a hydrogen atom or a lower alkanoyl group, with a compound of the formula,

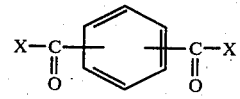
(III)

wherein X is a halogen atom, in the presence of an aliphatic, alicyclic or aromatic hydrocarbon solvent having a boiling point of 100° to 260° C., preferably 120° to 230° C. under atmospheric pressure, to produce bis(-carboxyphenyl)phthalate, adding a compound of the formula,

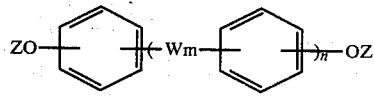
(V)

wherein W is —O—, —SO$_2$—, —S— or —CO—, Z is a hydrogen atom or an alkanoyl group, and m and n are each 0 or 1, and optionally a compound of the formula,

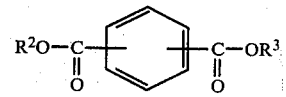
(IV)

wherein R$^2$ and R$^3$ are each a hydrogen atom, a benzyl, lower alkyl or phenyl group, and carrying out polycondensation (may be referred to as "polymerization" hereinafter) while simultaneously removing the solvent and by-products from the reactor so that the polycondensation system is made substantially free from the solvent at least at the end of the reaction and is capable of carrying out substantial bulk polycondensation.

In the present invention, bis(carboxyphenyl)phthalate is first synthesized by reaction between the compounds (II) and (III), and in this case, the use of a solvent is essential. The solvent is limited in boiling point in order to make the polymerization system substantially free from the solvent during polymerization to change into a mass. For producing the oxybenzoyl copolyesters of the present invention, it is necessary to select a solvent having the following properties: The boiling point is 260° C. or less, preferably 200° C. or less under atmospheric pressure since the polymerization should generally be carried out within a range of 200° to 400° C., preferably 260° to 380° C.; and the solvent acts to allow the synthetic reaction for bis(carboxyphenyl)phthalate to proceed smoothly and gives no adverse effect on the properties of polymers produced.

In the present invention, it is necessary to use aliphatic, alicyclic or aromatic hydrocarbon solvents having a boiling point of 100° to 260° C., preferably 120° to 230° C., more preferably 120° to 200° C. under atmospheric pressure. The amount of the solvent used in synthesizing bis(carboxyphenyl)phthalate is not particularly limited, but it is preferably at least 30 wt %, more preferably 50 to 90 wt %, based on the total of whole monomer and the solvent. As preferred examples of the solvent used in the present invention, there may be given for example ethylbenzene, xylene, cumene, n-propylbenzene, p-diethylbenzene, o-, m-, and p-cymene, n-butylbenzene, o-, m-, and p-ethyltoluene, 1,2,3,4-tetramethylbenzene, 1,2,3,5-tetramethylbenzene, 1,2,4,5-tetramethylbenzene, 1-methylanthracene, indane, $\beta$-ethylnaphthalene, biphenyl, octane, cyclooctane, nonane, decane, undecane, dodecane, tridecane, tetradecane, $\alpha$-methylnaphthalene and $\beta$-methylnaphthalene. When solvents other than those mentioned above, for example the halogen-substituted products of the foregoing solvents (e.g. o-dichlorobenzene), are used, polymers obtained by polymerization are poor in mechanical properties.

The present invention provides a process for producing oxybenzoyl copolyesters comprising partly or wholly of regularly arranged monomer units of the formula (I) by bulk polycondensation requiring no aftertreatment, which comprises reacting a compound (II) with a compound (III) in the foregoing solvent to synthesize bis(carboxyphenyl)phthalate, and (1) adding a compound of the formula (V), raising the temperature to distil out the solvent, and then distilling out low molecular weight products, followed by polycondensation, or (2) adding a compound of the formula (V) and an acid anhydride to produce an alkanoyl compound, distilling out the solvent and by-products produced by alkanoylation, and then distilling out low molecular weight products, followed by polycondensation.

Examples of the compound (II) used in the present invention, are p-hydroxybenzoic acid, m-hydroxybenzoic acid, phenyl p-hydroxybenzoate, phenyl m-hydroxybenzoate, isobutyl p-acetoxybenzoate, 3,5-dimethyl-4-hydroxybenzoic acid, and 3,5-dimethyl-4-hydroxybenzoate. Examples of the compound (III) include terepthaloyl chloride and isophthaloyl chloride. Examples of the compound (IV) include isophthalic acid, terephthalic acid, 2-methylterephthalic acid, diphenyl terephthalate, diethyl isophthalate, methyl ethyl terephthalate and isobutyl terephthalic half ester. Examples of the compound (V) include hydroquinone, resorcinol, m-diacetoxybenzene, 4,4'-biphenol, 4,4'-thiobiphenol, 4,4'-dihydroxydiphenyl sulfone, 4,4'-dihydroxydiphenyl ether and 4,4'-dihydroxydiphenyl ketone.

The foregoing dihydroxy compound may be alkanoylated before use in order to facilitate the reaction between the compound and bis(carboxyphenyl)phthalate in the presence of the solvent of the present invention. Examples of the lower alkanoic acid anhydride used for alkanoylation, are acetic anhydride, propionic anhydride, butyric anhydride and isobutyric anhydride. The alkanoylation is carried out while refluxing the acid anhydride or the acid produced therefrom. For example, acetylation with acetic anhydride is carried out at a refluxing temperature of 130° to 150° C.

The compounds of the formulae (II), (III), (IV) and (V) may be nuclear-substituted with an alkyl, aryl or other hydrocarbon group or halogen atom.

Polycondensation may be carried out at about 200° to about 400° C., preferably about 260° to about 380° C. Since the rate of polycondensation generally increases with increasing temperature, condensation at relatively high temperatures is favorable. Preferably bulk polycondensation is to continue until the reaction system substantially forms a solid phase while applying a constant shearing force, at the polymerization temperature, to the polymer resulting from the polymerization of monomer to prevent the polymer from agglomeration, thereby permitting the polymer to maintain solid dispersion without agglomeration. The polycondensation temperature can be easily determined considering the boiling point or decomposition point of the monomer or oligomer used. It is however desirable to carry out polycondensation as follows: Polycondensation is first carried out at a relatively low temperature which is then raised, for example, to between 200° and 250° C. with the progress of the condensation; and then polycondensation is carried out at 250° to 380° C., preferably 300° to 360° C., under atmospheric or reduced pressure. After a solid disperse system has once been formed, it is possible to further raise the reaction temperature, for example, to 310° to 400° C., preferably 310° to 370° C., taking into account the sintering temperature and decomposition temperature of the polycondensate. It is desirable that the reaction temperature is as high as possible in a range below the sintering temperature and decomposition temperature, because the rate of reaction increases with increasing reaction temperature.

Another embodiment for the polycondensation of the present invention is as follows: In the first-stage reactor, bis(carboxyphenyl)phthalate is synthesized from the compounds of the formulae (II) and (III) by dehydrohalogenation in a solvent (e.g. diethylbenzene). This reaction is best carried out by refluxing diethylbenzene at the boiling point (about 182° C.). It is important to thoroughly stir the reaction system so that the reaction proceeds uniformly and the system keeps a uniform slurry state, as the system takes a slurry form in some cases. Next, a compound of the formula (IV) is added to the reaction system, and in some cases, an acid anhydride may be further added to carry out alkanoylation in order to prepare a monomer susceptible to polycondensation. Thereafter, a carboxylic acid produced as a by-product and diethylbenzene are removed by raising the temperature. The reaction product is then transferred, as it is or after converting all or a part of said monomer to oligomer, to the second-stage reactor wherein the monomer and/or oligomer is converted to a prepolymer by polycondensation. The reaction product is then transferred to the third-stage reactor wherein the pre-polymer is converted to a high molecular weight polymer. In this case, the pre-polymer produced in the second-stage reactor may be taken out in the molten state, solidified, pulverized and then converted to a high molecular weight polymer in the third-stage reactor. Also, the pre-polymer may be pelletized by an extruder and converted to a high molecular weight polymer in the third-stage reactor.

Further, the inventors found that molded products of good appearance can be obtained even though the arrangement of the monomer units is not completely regular. The compound of the formula (III) may partly be replaced with the compound of the formula (IV), or the first reaction for synthesizing the monomer, bis(carboxyphenyl)phthalate, may not be accomplished. Particularly, in order to obtain molded products of good appearance, the copolyesters produced by the present invention contain preferably at least 50 mole %, more preferably at least 70 mole % of the repeating units of the formula (I).

Since the process of the present invention is of a bulk polycondensation form, the after-treatment of the resulting polymer is not necessary. Consequently, no use of catalyst is suitable for the objects of the present invention. For elevating the rate of reaction, however, gaseous Lewis acids are desirable as a catalyst. Of the Lewis acids, hydrogen halides, particularly hydrogen chloride, are preferred. When catalyst residues have no adverse effect on the polymer, catalysts commonly used for the preparation of polyesters may be used.

In the present invention, stabilizers, coloring agents and fillers may be added to the polymerization system. Particularly, when the fillers are inactive to the polymerization, the addition of the fillers makes it easy to convert the polymer to a solid dispersion on bulk polymerization. The fillers include for example silica, quartz powder, sand, fumed silica, silicon carbide, aluminum oxide, glass fiber, tin oxide, iron oxide, zinc oxide, carbon, graphite, and pigments such as titanium oxide, other inorganic pigments and heatresistant organic pigments.

The present invention will be illustrated with reference to the following examples, which are however only given for the purpose of illustrating preferred embodiments and are not to be interpreted as limiting the invention thereto.

EXAMPLE 1

To a polymerization reactor equipped with an anchor-shaped agitator and having a narrow clearance between the reactor wall and the agitator blade, were added phenyl p-hydroxybenzoate (215 g), terephthaloyl chloride (90 g) and diethylbenzene (1,000 g). After introducing nitrogen gas into the reactor, the temperature was raised to 180° C., followed by refluxing. At that time, hydrochloric acid was produced with a rise in the temperature. Hydrochloric acid from the top of the reflux condenser was neutralized with an aqueous sodium hydroxide solution, and the amount of recovered hydrochloric acid was determined. At the point when the recovery percentage of hydrochloric acid reached 95%, the temperature was lowered to 150° C., and hydroquinone (55 g) was added. After thorough stirring and replacement with nitrogen, the temperature was again raised to 230° C. to distil out diethylbenzene. When the removal of diethylbenzene was almost finished, the temperature was further raised from 230° C. to 320° C. over 10 hours with distilling out phenol. Thereafter, stirring was continued at 320° C. for 16 hours, when the torque gradually increased, but, on continuing stirring for further 30 minutes, the torque began to lower. The temperature was gradually raised to 340° C. without a rise in the torque, and kept at 340° C. for 3 hours to finish the polymerization. Thereafter, the reactor was cooled, and when the temperature reached 200° C., the powdery product was taken out of the reactor. The amount of the powder was 268 g (93% of theoretical amount). On injection-molding at 390° C., the molded product had a tensile strength of 885 kg/cm². The appearance of the molded product was good.

EXAMPLE 2

To a reactor equipped with an anchor-shaped agitator p-hydroxybenzoic acid (276 g), terephthaloyl chloride (203 g) and diethylbenzene (1,000 g) were added while passing nitrogen gas through the reactor. The temperature was raised to 180° C., and reaction was carried out at 180° C. for 5 hours under reflux. When the recovery percentage of generated hydrochloric acid reached 95%, the temperature was lowered to 100° C. At that point, 4,4'-dihydroxydiphenyl (186 g) and acetic anhydride (245 g) were added while passing nitrogen gas. The temperature was then raised to 150° C., and reaction was carried out at 150° C. for 3 hours under reflux. After the reaction was finished, acetic acid and diethylbenzene were distilled out while increasing the temperature. When the temperature reached 300° C., the melt was fed to a twin-screw kneader previously heated to 300° C. under nitrogen stream. The melt was heated to 330° C. to distill out acetic acid while applying a high shearing force. An increase in torque was observed. Polymerization was continued for additional 3 hours with powerful stirring, and then the reaction system was gradually cooled to 200° C. with powerful stirring. The powdery product was sent to a rotary oven, gradually heated to 360° C. over 6 hours while passing nitrogen gas, cooled to 200° C. and taken out of the oven. The amount of the resulting powdery polymer was 513 g (yield 92%). On injection-molding at 390° C., the molded product obtained had a tensile strength of 799 kg/cm², and its appearance was good.

In the second-stage reactor, polymerization was carried out at 330° C. for 3 hours, and the resulting product was passed through a twin-screw kneader-extruder joined to the reactor, extruded therefrom as strand of 2 mm in diameter and cut into pellets. The pellets were placed in a rotary oven, gradually heated from room temperature to 370° C. over 10 hours under reduced pressure, cooled to 200° C. and taken out. On injection-molding at 390° C., the molded product had a tensile strength of 808 kg/cm².

EXAMPLE 3

According to the method of Example 2, reaction between p-hydroxybenzoic acid and terephthaloyl chloride was carried out at 140° C. for 3 hours under reflux using xylene as solvent in place of diethylbenzene. The recovery percentage of generated hydrochloric acid was 91%. The subsequent procedure and condition were the same as in Example 2. The amount of polymer obtained was 509 g (yield 91%). On injection-molding at 390° C., the molded product had a tensile strength of 885 kg/cm² and a good appearance.

EXAMPLE 4

According to the method of Example 2, reaction between p-hydroxybenzoic acid and isophthaloyl chloride was carried out at 140° C. for 3 hours under reflux. The recovery percentage of hydrochloric acid as by-product was 88%. The subsequent procedure and condition were the same as in Example 2. The amount of polymer obtained was 516 g (yield 92%). The polymer was mixed with a stabilizer, pelletized and injection-molded at 390° C. The molded product had a tensile strength of 790 kg/cm², and its appearance was good.

EXAMPLE 5

To a 5-liter separable glass flask equipped with an anchor-shaped agitator under nitrogen atmosphere were added p-hydroxybenzoic acid (276 g), terephthaloyl chloride (152 g) and diethylbenzene (1,000 g), and reaction was carried out under reflux for about 5 hours. The recovery percentage of hydrochloric acid generated was 97%. Thereafter, the reaction mixture was cooled to 110° C., and 4,4′-dihydroxydiphenyl (186 g), terephthalic acid (42 g) and acetic anhydride (286 g) were added thereto while passing nitrogen gas. The temperature was again raised, and reaction was carried out under reflux for about 3 hours. The ratio of terephthaloyl chloride to terephthalic acid in the reaction system was 75 to 25. Immediately after the reaction was finished, the temperature was raised to 300° C. during which diethylbenzene and acetic acid were distilled out.

Polymerization was then allowed to proceed in the same manner as in Example 2 to obtain 522 g (yield 94%) of a polymer. On injection-molding at 390° C., the molded product had a tensile strength of 820 kg/cm², and its appearance was good, showing the same moldability as that of the polymer obtained in Example 2.

EXAMPLE 6

Monomer preparation and polymerization were carried out in the same manner as in Example 1 except that, in the monomer preparation, the amount of phenyl p-hydroxybenzoate was decreased from 215 g to 108 g and 107 g of phenyl m-hydroxybenzoate was added instead thereof. As a result, 254 g (88% of theoretical amount) of a polymer was obtained. On injection-molding at 390° C., the molded product had a tensile strength of 905 kg/cm² and good moldability and appearance.

COMPARATIVE EXAMPLE 1

According to the method of Example 5, p-hydroxybenzoic acid (276 g), terephthaloyl chloride (51 g) and diethylbenzene (1,000 g) were mixed, and reaction was carried out under reflux for 5 hours. After cooling the reaction system to 110° C., terephthalic acid (125 g), 4,4′-dihydroxydiphenyl (186 g) and acetic anhydride (415 g) were added, and reaction was carried out at 150° C. for 3 hours. The ratio of terephthaloyl chloride to terephthalic acid in the system was 25 to 75. After the reaction was finished, the temperature was raised to 300° C. during which acetic acid and diethylbenzene were distilled out. Thereafter, polymerization was carried out in the same manner as in Example 2 to obtain 496 g of a polymer. On injection-molding at 390° C., the molded product showed a remarkable fibrillation at the surface layer, and its appearance was poor. Further, the range of molding temperature of this polymer was very narrow as compared with the polymer obtained in Example 5.

What is claimed is:

1. A process for producing oxybenzoyl copolyesters comprising 3 to 300 of at least a portion of a repeating unit of the formula,

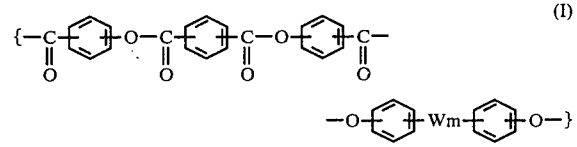

wherein m and n are each 0 or 1, and W is —O—, —SO₂—, —S—, or —CO—, which comprises reacting at least a portion of the amount present of a compound of the formula (II),

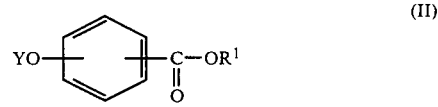

wherein R¹ is a hydrogen atom, a benxyl, lower alkyl or phenyl group, and Y is a hydrogen atom or a lower alkanoyl group, with at least a portion of the amount present of a compound of the formula (III),

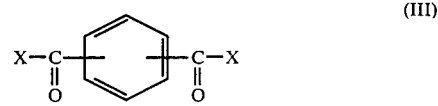

wherein X is a halogen atom, in the presence of an aliphatic, alicyclic or aromatic hydrocarbon solvent having a boiling point of 100° to 260° C. under atmospheric pressure to produce bis(carboxyphenyl)phthalate, adding a compound of the formula (V),

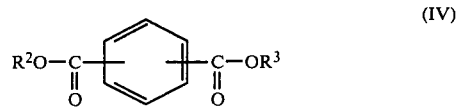

wherein W is —O—, —SO₂—, —S— or —CO—, Z is a hydrogen atom or an alkanoyl group, and m and n are each 0 or 1, and optionally a compound of the formula (IV),

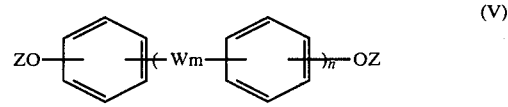

wherein R² and R³ are each a hydrogen atom, a benzyl, lower alkyl or phenyl group, and carrying out polycondensation with the removal of the solvent and by-products so that the polymerization system is made substantially free from the solvent at least at the end of the polycondensation to carry out substantial bulk polycondensation.

2. A method according to claim 1, wherein said oxybenzoyl copolyesters contain at least 50 mole % of the structure of the formula (I).

3. A method according to claim 2, wherein said oxybenzoyl copolyesters contain at least 70 mole % of the structure of the formula (I).

4. A method according to claim 1, wherein the boiling point of the solvent is within a range of 120° to 230° C. under atmospheric pressure.

5. A method according to claim 4, wherein the solvent is a member selected from the group consisting of ethylbenzene, xylene, cumene, n-propylbenzene, p-diethylbenzene, o-, m-, and p-cymene, n-butylbenzene, o-, m-, and p-ethyltoluene, 1,2,3,4-tetramethylbenzene, 1,2,3,5-tetramethylbenzene, 1,2,4,5-tetramethylbenzene, 1-methylanthracene, indane, β-ethylnaphthalene, biphenyl, octane, cyclooctane, nonane, decane, undecane, dodecane, tridecane, tetradecane, α-methylnaphthalene and β-methyl-naphthalene.

* * * * *